United States Patent Office 3,389,001
Patented June 18, 1968

3,389,001
GLASS BONDED CERAMIC WARE PRESSING MOLD AND METHOD OF MAKING SAME
Andrew R. Blackburn, Westerville, and Virgil D. Kendall, Springfield, Ohio, assignors, by mesne assignments, to Ram, Incorporated, Springfield, Ohio, a corporation of Michigan
No Drawing. Continuation of application Ser. No. 309,894, Sept. 18, 1963. This application Aug. 19, 1966, Ser. No. 573,727
3 Claims. (Cl. 106—38.9)

The present application is a continuation of application Ser. No. 309,894, filed Sept. 18, 1963, now abandoned.

This invention relates generally to porous ceramic molds especially adapted for use in pressing ware from clay or similar ware forming materials. More particularly, the invention is directed to a glass bonded ceramic for use in ware pressing molds and the method of making same.

In the ceramic industry plaster of Paris has been used in the manufacture of porous molds for the production of pressed ceramic ware. While possessing excellent porosity characteristics for ware pressing molds it is deficient for such use by reason of its lack of durability when exposed to repeated ware pressing operations and its poor tensile strength.

The plaster of Paris mold has found substantial use in the ware pressing techniques of the RAM process for forming ceramic ware. In this process, a moist clay mass to be formed into the ware is pressed between mold halves whereupon moisture enters the pores of the plaster of Paris mold. Thereafter, the pressed ware is released from the mold halves by directing a release fluid such as air through the porous mold face. This type of process for manufacturing ceramic ware by a pressing operation is more fully described in United States Patent 2,584,109 to Blackburn and Steele.

A mold material ideal for use in carrying out this process should possess certain characteristics to be effective. It should have relatively high strength to withstand the stresses encountered in pressing the clay into the ware shape and resistance to wear by repeated pressings with the mold. Critically important characteristics for the material are a uniformly distributed porosity made up of small pores throughout the mold which will insure that uniform release of the pressed ware from the surfaces of the mold halves can be achieved by application of the release pressure and that very fine surface pores are present on the surfaces of the mold halves so that the pressed ware will possess the desired smooth surface after release from the mold surfaces. As far as these porosity characteristics are concerned the material can well closely approximate the porosity characteristics of plaster of Paris. Analysis indicates that plaster of Paris has a porosity of 40% to 45%, i.e., 40% to 45% of the volume of the material is made up of pores or voids while the remainder is solid material, with the pore size averaging about 3 microns ranging from about ½ micron to 5 microns.

Obtaining a ceramic having the above outlined characteristics to be suitable for molds used in ware pressing operations that employ fluid pressure release of the ware from the mold is frought with difficulties. United States Patent 2,809,898 to Thiess suggests a porous ceramic mold made up of 45% to 65% calcined alumina together with varying amounts of ball clay and china clay. Such a mold has porosity to absorb moisture from the piece being pressed so that it will shrink free from the mold. Under this process, the high degree of uniformity in small pore size and distribution of pores necessary where pressure release of the ware is used for high speed ware production are not required. Achieving the requisite tensile strength for molds to be used in high speed pressing with fluid pressure ware release is also difficult particularly where small pore size and uniform porosity are required for the mold.

In solving the above-mentioned problems where prior art ceramics have been found deficient, applicants have discovered that by incorporating a unique combination of materials, namely raw kyanite, clay and a flux, in predetermined proportions with the requisite amount of liquid such as water to render the composition formable into the desired mold shape, forming this composition into such shape followed by firing the resultant mold shape, a new and useful mold of glass bonded ceramic material is produced which possesses the requirements for high speed pressing using fluid pressure release to free the pressed ware from the mold.

It is, therefore, a principal object of the present invention to provide a composition for permanent glass bonded ceramic molds having as its major components, kyanite and clay with the addition of minor amounts of a flux and which possesses high strength for long mold life and porosity characteristics appropriate for use of the molds in ware pressing operations.

Another object of this invention is to provide a glass bonded ceramic for ware pressing molds comprising 30% to 55% raw kyanite, 25% to 45% clay and 15% to 25% flux and which possesses high strength for long mold life and porosity characteristics appropriate for use in ware pressing operations.

It is a further object of this invention to provide a method of forming a uniformly porous glass bonded ceramic mold having high strength for long mold life and proper porosity characteristics for ware pressing use comprising the steps of mixing a composition containing major amounts of kyanite and clay and a minor amount of flux with water to render the mixture formable, forming said composition into a mold of predetermined shape for the desired ware to be pressed, and firing the body for a time and at a temperature sufficient to produce a glass bonded ceramic body, such body having high strength with substantially uniform distribution of fine pores throughout the mold to assure uniform release of pressed ware from the mold surface upon the application of release pressure.

The above objects are attained by mixing a naturally occurring refractory such as kyanite, unique in that it expands under heat and thus aids in providing the requisite pores in the final mold product, together with a small amount of a flux such as feldspar, talc or syenite and a clay such as china clay, ball clay or a mixture thereof. The resultant mixture, with an appropriate amount of liquid to render it moldable, is formed into the mold shape for the desired ware configuration to be pressed and thereafter the mold shape is fired. A porous mold having a modulus of rupture of up to 10,000 lbs. per square inch with a porosity of up to 40% and a pore size ranging from 3 to 10 microns is thus produced.

Though applicants do not wish to be limited to any particular theory, it appears that the required uniformly distributed small pores result from the fact that the quartz from the clay, kyanite and incipient mullite comprise a skeleton held together by glass which does not exist in sufficient quantity to fill the interstices between the unaltered crystal phases present. This glass bonded body has a primary refractory phase which undergoes a permanent expansion during firing, thus promoting the desired uniform port structure throughout the body and promoting glass formation to a much greater degree than in prior art porous ceamic bodies. Thus, a ceramic mold material of greater strength and allowing closer pore size and pore distribution control results. This glass bonded body is essentially an equilibrium body so far as the reactive ingredients are concerned. The kyanite remains unaltered as the skeletal primary refractory phase and the quartz introduced with the clay persist as such apparently contributing no silica to the glass phase.

Though the ingredients of this composition may be mixed in any known manner, it has been found that ball mill mixing of the ingredients instead of say a blunging mixing operation produces a significant improvement in the final strength of the ceramic body of the mold in addition to producing smaller and more uniformly distributed pores.

The exact proportions present in the composition may vary considerably although, it is preferred that the proportions be within the following ranges for best results:

Raw kyanite in the range of 30% to 55% and the clay and flux in the ranges of 25% to 45% and 15% to 25% respectively.

It has been found that the addition of 1% to 4% of a carbon black such as lamp black to the composition incidental to the mixing and prior to firing increases the final porosity as much as 6%. Upon firing the carbon black is burned out of the composition. This "burnout" in the form of carbon black mixed through the composition aids in effectively controlling the pore size, in addition to providing uniform distribution of the pores throughout the final ceramic mold body.

The ceramic mold body mixture may be formed into the desired mold configuration for the shape ware to be pressed by any prior art process such as slip casing or injection molding. The body mixture may be prepared to be suitable for casting to have a specific gravity of 1.90 to 2.00 with a viscosity suitable for the type of forming to be used. Forming the mold into the desired configuration is simplified by use of the injection molding process described in United States Patent 2,669,762 to Blackburn and Steele.

The composition after molding is fired at temperatures ranging from 1900° F. to 2075° F. for a period ranging from 2 to 5 hours. The particular temperatures used for any specific composition will vary depending upon the amount of kyanite, clay and flux present.

By way of illustration, the following specific ceramic mold body may be mentioned as exemplary of particular ingredients and proportions thereof suitable to form a ware pressing mold. The body is formed from a composition containing 29% ball clay, 8% china clay, 7% flux in the form of a low melting alkaline frit, 10% syenite which is a naturally occurring alkaline flux used as a glass forming ingredient, and 46% kyanite. The kyanite particle size is —325 mesh while the other ingredients are of standard "air floated" grind fineness. These ingredients are mixed together with a sufficient amount of water to form a slurry in a ball mill. After mixing, the resultant slurry is cast into the desired shape for the ware to be pressed with the mold. After casting, the mold body is preferably fired for five hours at 2,000° F.

The present invention has been described in detail above for purposes of illustration only and is not intended to be limited by this description or otherwise except as defined in the appended claims.

What is claimed is:

1. A uniformly porous glass bonded ceramic mold composed of a composition comprising as major components 30% to 55% raw kyanite and 25% to 45% clay, and including 15% to 25% flux, said mold having substantially uniformly distributed small pores for effective ware release in use of the mold on a ware press.

2. A porous glass bonded ceramic mold according to claim 1 wherein the composition includes 29% ball clay and 8% china clay as the clay component, and 7% low melting alkaline frit and 10% syenite as the flux component, the percentages of each ingredient being based on the total ceramic composition.

3. A porous glass bonded ceramic mold according to claim 1 wherein 1 to 40% carbon black is added to said composition prior to firing said composition into a ceramic mold.

References Cited
UNITED STATES PATENTS

| | | | |
|---|---|---|---|
| 2,007,053 | 7/1935 | Howe | 264—43 |
| 2,485,724 | 10/1949 | Ford | 264—43 |
| 2,809,898 | 11/1957 | Thiess | 106—38.9 |
| 2,890,126 | 6/1959 | Ford | 106—40 |
| 2,892,227 | 6/1959 | Operhall. | |

JAMES A. SEIDLECK, *Primary Examiner.*

ALEXANDER H. BRODMERKEL, *Examiner.*

L. B. HAYES, *Assistant Examiner.*